United States Patent
Laakso et al.

(10) Patent No.: US 7,587,217 B1
(45) Date of Patent: Sep. 8, 2009

(54) POWER CONTROL METHOD BASED AT LEAST PARTLY ON SPREAD SPECTRUM TECHNIQUE

(75) Inventors: Janne Laakso, Helsinki (FI); Riku Jäntti, Solna (SE); Mika Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 1777 days.

(21) Appl. No.: 09/249,216

(22) Filed: Feb. 12, 1999

(30) Foreign Application Priority Data

Feb. 13, 1998 (FI) ....................................... 980343

(51) Int. Cl.
*H04B 7/00* (2006.01)

(52) U.S. Cl. ....................................... 455/522; 370/318

(58) Field of Classification Search ................. 455/522, 455/69; 375/130; 370/318
See application file for complete search history.

(56) References Cited

U.S. PATENT DOCUMENTS

| 5,349,630 | A |   | 9/1994  | Sointula ........................ 379/58 |
| 5,491,837 | A | * | 2/1996  | Haartsen ....................... 455/522 |
| 5,564,074 | A |   | 10/1996 | Juntti .......................... 455/67.1 |
| 5,566,165 | A |   | 10/1996 | Sawahashi et al. ............. 370/18 |
| 5,570,353 | A |   | 10/1996 | Keskitalo et al. .............. 370/18 |
| 5,574,984 | A | * | 11/1996 | Reed et al. .................... 455/522 |
| 5,604,730 | A |   | 2/1997  | Tiedemann, Jr. ............. 370/252 |
| 5,623,486 | A |   | 4/1997  | Dohi et al. .................... 370/342 |
| 5,629,934 | A |   | 5/1997  | Ghosh et al. .................. 370/335 |
| 5,631,898 | A |   | 5/1997  | Dent ............................. 370/203 |
| 5,844,884 | A |   | 12/1998 | Szlenski ....................... 370/149 |
| 5,937,014 | A | * | 8/1999  | Pelin et al. .................... 375/340 |
| 6,067,446 | A | * | 5/2000  | Persson et al. ................. 455/69 |
| 6,137,840 | A | * | 10/2000 | Tiedemann et al. ......... 375/297 |

FOREIGN PATENT DOCUMENTS

| EP | 94305901.4   | 8/1994  |
| EP | 96660042.1   | 8/1996  |
| EP | 96120790.9   | 12/1996 |
| EP | 97108298.7   | 5/1997  |
| EP | 97108707.7   | 5/1997  |
| EP | 0 810 743 A2 | 12/1997 |

OTHER PUBLICATIONS

Finnish Search Report.
European Search Report for Patent Application No. 99301042.0 dated May 30, 2003.

* cited by examiner

*Primary Examiner*—Raymond S Dean
(74) *Attorney, Agent, or Firm*—Perman & Green, LLP (57) ABSTRACT

In connection with the determination the transmit power of a beginning transmission there is also determined, in the method according to the invention, suitable output powers for other transmissions, so that the entity formed by all controlled transmissions is as close to the optimum as possible already at the beginning of a new frame. The method according to the invention takes into consideration the effect of a beginning transmission on other transmissions. The method according to the invention further takes into consideration changes in the conditions during the previous frame by including the control history of the fast power control as initial information of the calculation made during the re-determination of the output powers, for instance as a suitable statistical quantity of the transmission history of each transmission, for instance as an average over a certain period.

25 Claims, 4 Drawing Sheets

POWER CONTROL METHOD BASED AT LEAST PARTLY ON SPREAD SPECTRUM TECHNIQUE

OBJECT OF THE INVENTION

The object of the invention is the power control in a CDMA system, particularly a power control method according to the preamble of claim 1.

TECHNICAL BACKGROUND

Radio connections must achieve a certain correctness so that they can transmit information in a desired manner. This can be achieved with a sufficiently high C/I ratio (Carrier to Interference Ratio), which represents the ratio of the received carrier power to the simultaneously received interference power. For prior art cellular systems it is typical that a certain target level is defined for the C/I ratio (or for the SIR—Signal to Interference Ratio—of for the S/N—Signal to Noise ratio—or for the S/(I+N)—Signal to Noise plus Interference ratio—or for some other corresponding factor), and that the transmit power for each radio connection is controlled to be so high that the target level is barely reached. It is not beneficial to have a higher transmit power than that which is required to reach the target level of the C/I ratio, because an unnecessary high transmission power consumes electric energy in the transmitting device and causes interference to other simultaneous radio connections.

In the CDMA system the SIR value of the i:th packet of a cell can be calculated with the formula below:

$$SIR_i = G_i \frac{P_{rx,i}}{\sum_j P_{rx,j} + P_{other} + P_N} \quad (1)$$

where $P_{rx,i}$ is the power received by the i:th user, $$\sum_j P_{rx,j}$$

is the total power of the own cell, $G_i$ is the process gain of the i:th packet, $P_{other}$ is the interference power of the other cells, and $P_N$ is the external temperature noise or background noise.

When a new transmission is initiated the base station must define the required transmit power in some way. If the transmit power is too low there will occur too much errors in the connection. On the other hand, if the transmit power is too high, this will interfere with the other connections in the cell. When the new transmission is initiated the required output power is typically controlled in a so called open-loop power control on the basis of link gain measurements. The output power is determined on the basis of the desired error level e.g. according to the formula (1), by using the signal level of the base station's pilot signal detected by the mobile station when value of the term $P_{rx,i}$ is evaluated.

Figure 1:
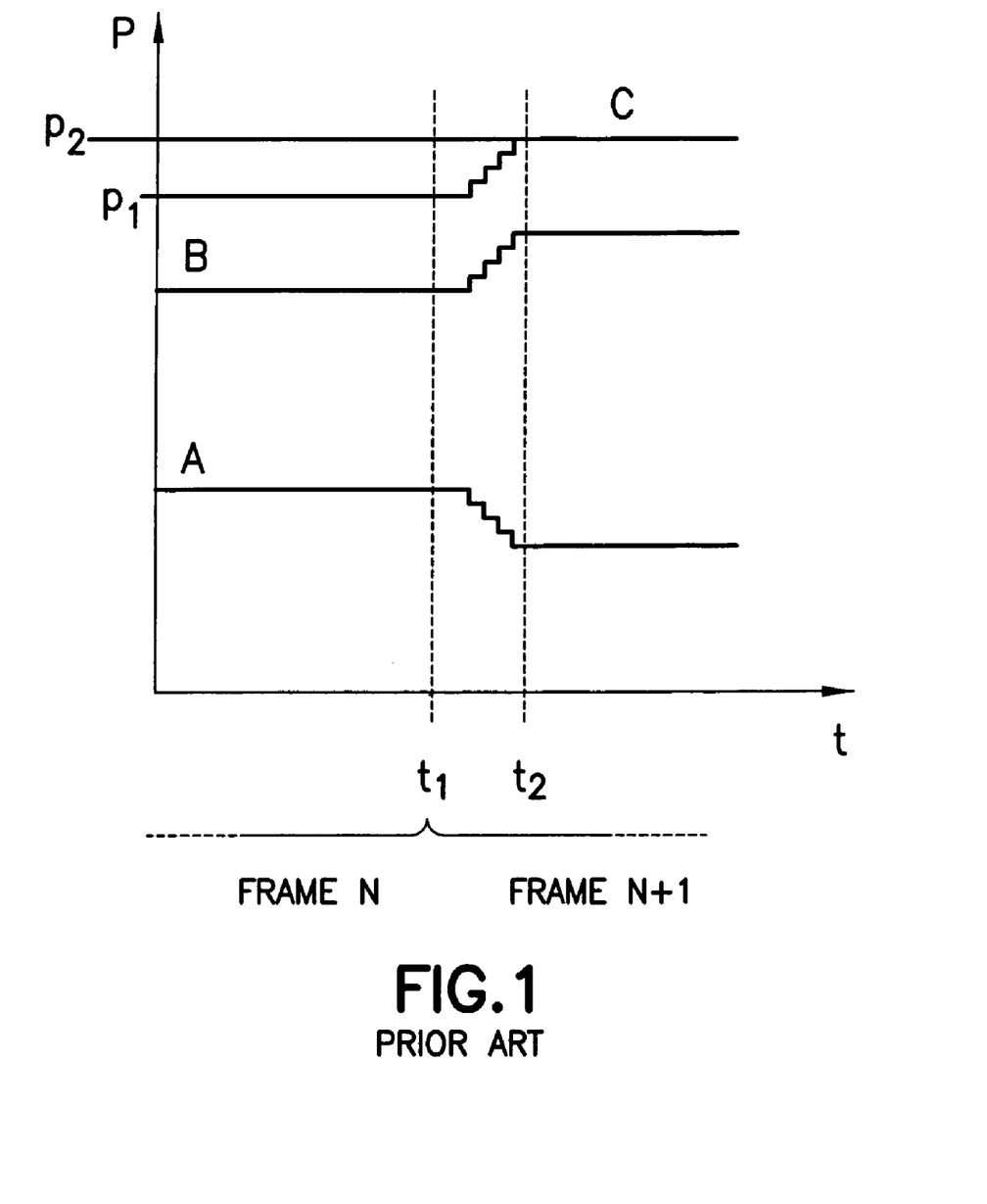
FIG. 1 illustrates the power control error occurring in prior art power determination methods.

FIG. 1 illustrates a situation which occurs at the beginning of a new transmission. In this schematic example there are two mobile stations within the base station area, whereby the transmit powers of their transmissions are represented by the curves A and B. In FIG. 1 a new frame begins at moment $t_1$. At the beginning of a new frame also the mobile station C begins to transmit. The transmit power $p_1$ used by the mobile station C at the beginning of the frame is typically determined according to the formula (1). However, the transmission C interferes with the other connections in the cell, whereby the error level of the connections will increase. Therefore the base station must control the power levels of the other transmissions, which results in that also the power level of the transmission C must be changed. The base station adjusts the transmit powers of the mobile stations until the number of errors occurring in different connections is reduced to the target level and the SIR target levels for each connection are obtained. In FIG. 1 this transmit power control is represented by the segments of the curves A, B and C between the moments $t_1$ and $t_2$. At the moment $t_2$ the desired target error level is obtained, whereby the transmit power of the transmission C has changed from power $p_1$ to power $p_2$. However, a practice like this has an disadvantage in that the transmit powers are not optimal between the moments $t_1$ and $t_2$, and errors occur in the connections. A fast power control corrects the transmit powers in a desired way to their optimal values, but communication capacity is lost before the desired error levels are obtained. Regarding FIG. 1 it must be noted that for the sake of clarity it shows only the search of power levels which compensate for the interference, and that the effect of a possible fast fading is not shown.

Situations in which the power levels of the transmissions are not optimal are not only caused by the beginning of a transmission, but also by the end of a transmission, or in more general terms by a changed number of transmissions. When a new frame begins the powers used for transmissions which extend over the frame boundary, such as the transmissions A and B in the example of FIG. 1, are based on the interference situations of the previous frame or of previous frames. Thus the power levels of the transmissions A and B are calculated on the basis of interfering transmissions which are different from those being active in the new frame. For instance half of the packets in the considered frame can relate to active bearers in the previous frame and half of the packets can relate to non-active bearers in the previous frame. In such an example half of the transmissions causing interference in the previous frame are not anymore active during the new frame, whereby the power levels used at the end of the previous frame are not anymore correct at the beginning of the new frame.

The term "bearer" means an entity formed by all such factors which have an impact on the communication between the base station and a certain terminal. The term bearer relates i.a. to the transmission rate, delay, bit error rate, and variations of these between certain minimum and maximum values. A bearer can be perceived as a communication channel formed by the added effect of these factors, whereby the channel connects the base station and a certain terminal and can carry useful data, i.e. payload information. One bearer always connects only one terminal to one base station. Multimode terminals can simultaneously maintain several bearers, which connect the terminal to one base station. If the system is able to use macro diversity combination, then the bearer or bearers can simultaneously connect the terminal to the network via more than one base station.

The problem described in the previous paragraphs is particularly inconvenient in packet traffic. If the connections between the base station and the mobile stations are so called real time connections (RT connections), such as for instance voice connections, then the transmissions typically extend as uniform transmissions over several frames, whereby the search for the power level at the beginning of the transmission represents a very small proportion of the transmission time. In packet communication, more generally in non-real time connections (NRT connections), the data is transmitted in a minimum case as packets with the length of one frame, whereby the search for the power level at the beginning of the packet transmission forms a considerable proportion of the transmission time.

One way to solve the above described problems is to recalculate the power levels of all transmissions with the open loop principle when the number of transmissions changes. However, such a solution has a disadvantage in that it does not consider the effect of the fast power control on the transmit power of bearers, which were active in the previous frame. When required the base station continuously adjusts the output powers. The base station must adjust the output powers, typically to compensate for the effects of the slow fading and the fast fading on different connections and for the effect of mutual interference between the different transmissions.

For instance, if the base station during a frame can give at most 16 power control instructions, with which the transmit power increases or decreases 1 dB, then due to a momentary change in the conditions the transmit power of one transmission can rise 16 dB during the same frame, or be multiplied by 40, or decrease to 1/40 compared to the output power at the beginning of the frame. If the output power calculated with the open loop principle deviates less than 16 dB from the correct value, then the power control has time to adjust the output power to the correct value during one frame. However, the values calculated with the open loop principle can deviate much more from the correct value, whereby the power control does not have time to correct the power to the correct value during one frame.

BRIEF DESCRIPTION OF THE INVENTION

The object of the invention is to minimise that time which passes after a step-wise change in the amount of communication until the transmit powers of a controlled transmission cluster are optimally controlled. An object of the invention is also to improve the capacity of the radio interface in CDMA systems with packet communication. A further object of the invention is to minimise the power control error in the whole controlled transmission cluster caused by packet traffic with a short duration.

These objects are attained by recalculating the power values of substantially all transmissions of the whole cell or of another controlled transmission cluster when new transmissions begin or when old ones are terminated, and by taking into consideration in the calculation at least a part of the power control history of transmissions extending over the frame border, i.e. over the calculation boundary. A control method of this type can in advance consider the effect which for instance beginning transmissions have on transmissions extending over the calculation boundary, whereby the output powers of different transmissions are very close to the optimum already when the new transmissions begin and the new power values are applied.

The power control method according to the invention is characterised in what is presented in the characterising clause of the independent method claim. An element of a mobile phone network according to the invention is characterised in what is presented in the characterising clause of the independent claim regarding an element of a mobile phone network. The load control method according to the invention is characterised in what is presented in the characterising clause of the independent claim regarding the load control method. The method for controlling the bearer's transmit powers is characterised in what is presented in the characterising clause of the independent claim regarding the method for controlling the transmit powers of the bearers. Other preferred embodiments of the invention are presented in the dependent claims.

In connection with the determination of the transmit power of a beginning transmission the method according to the invention also determines the output powers which are suitable for other transmissions, so that the entity formed by all controlled transmissions is as close to the optimum as possible already at the beginning of a new frame. The method according to the invention takes into consideration the effect of a beginning transmission on other transmissions. The optimal output power values will change when the fast fading is changing, but the method according to the invention tries to find correct transmit powers for the transmissions as fast as possible so that the transmit powers correspond to the prevailing situation regarding fading and interference.

The method according to the invention further considers changes in the conditions which occurred during the previous frame by adding the control history of the fast power control to the input data for the calculation made during the re-determination of the output powers. In the simplest way the effect of the fast power control can be taken into consideration by taking as input data for the calculation only that transmit power, which the respective transmission used at the end of the previous frame. However, the momentary transmit power can vary even very fast due to the conditions, whereby a better picture of the current conditions on the radio path can be obtained by taking as input data for the calculation a suitable statistical quantity from the transmit power history of each transmission, such as an average over a certain period. Advantageously such an average can be calculated e.g. over a certain period at the end of the previous frame, or over the whole frame. The average can also be calculated over several frames, if required. As a statistical quantity of this type it is also possible to use another quantity than a mere average, such as for instance an average weighted in a desired way. Such a weighted average can advantageously give a higher weight to the power values used at the end of the previous frame than to earlier values. As input data it is also possible to use for instance an average which is weighted by the ratio of two averages calculated over periods with different lengths, or any other suitable statistical quantity.

With the aid of the power control method according to the invention the transmit powers of the mobile stations and the base station in the area of one cell can be advantageously controlled. However, the invention is not limited to this, but the method is also applicable to simultaneous optimisation of the transmit powers in more than one cell. With the aid of the method according to the invention it is also possible to manage the transmissions in a certain part of a cell, such as a certain sector of a cell which is divided into sectors. The invention is also applicable to the power control of only certain bearers, which strongly interfere with each other.

The power control method according to the invention is also applicable in such situations where a transmission is terminated at the end of a frame. If the power levels of other transmissions are not correspondingly corrected, then the power levels will not be at the optimum, whereby communication capacity is lost. In prior art systems the power level optimisation is also in this situation given as a task to the fast power control. Then communication capacity is lost at the beginning of the next frame during that time which is needed to find the optimum values of the transmit powers. With the aid of the method according to the invention the transmit powers can also in this situation be set as close to the optimum values as possible, already at the beginning of a frame.

The method according to the invention is generally applicable in all such situations where the amount of information to be transmitted over the radio path is changing. For instance, if a bearer which was active in the previous frame requires a doubled data transmission capacity, whereby the bearer's transmit power is also doubled when the other connection parameters remain unchanged, then this will have an effect on the other bearers in a similar way as there would have been a new bearer starting at the beginning of the frame. Correspondingly, a reduction of the transmission rate has the opposite effect.

BRIEF DESCRIPTION OF THE DRAWINGS

Below the invention is described in more detail with reference to preferred embodiments presented as examples, and to the enclosed figures in which.

The same reference numerals and markings are used for corresponding parts in the figures.

DETAILED DESCRIPTION OF PREFERRED EMBODIMENTS OF THE INVENTION

In the method according to the invention the expected SIR values (signal-to-interference ratio) or for instance the expected S/N values (signal-to-noise ratio) of the simultaneously transmitted packets are controlled to a certain target level for e.g. each bearer or for each bearer class, considering the required power variations due to the fast fading for those bearers, which were active in the previous frame or in the previous frames, and for which the control history of the fast power control due to the fast fading is thus known. Thus the method according to the invention uses the information about the executed fast power control actions during the previous frames to update the calculation of the new transmit powers, whereby the obtained information about the transmit powers required by the packets is more accurate than in prior art methods.

In the power control method according to the invention the calculation of the SIR values can be made for instance in the following way:

$$\gamma_{ij} = \frac{G_{ij} \bar{E}_{ij} P_{ij}}{\alpha \bar{E}_{ij} \sum_{l=1}^{No\_MS_i} P_{il} + \sum_{\substack{m=1 \\ m \neq i}}^{No\_BS} \tilde{L}_{mij} + \sum_{n=1}^{No\_MS_m} P_{mn} + P_N} \quad (2)$$

where $\gamma_{ij}$ is the target SIR level of the packet or bearer j of the base station i, $\tilde{L}_{mij}$ is the link gain between the base station m and the terminal relating to the bearer j of the base station i, Pij is the transmit power of the packet/bearer j of the base station i, Gij is the process gain of the packet/bearer j of the base station i, No_BS is the number of base stations in the base station neighborhood controlled by one base station controller, No_MS$_m$ is the number of active bearers of the base station m (m=1, 2, . . . , No_BS), $\bar{E}_{ij}$ is the link gain $L_{ij}$ between the base station i and the terminal relating to its bearer j divided by the control history $f_{ijH}$ of the fast power control of the considered bearer, $P_N$ is a noise term, and α is a factor representing the orthogonality of the codes of the own cell, $\alpha \in (0,1]$. The value of the factor α is one if the orthogonality of the codes of the own cell is not considered.

The term $f_{ijH}$ representing the control history can be generated in many different ways. The control history can be generated for instance in the following way:

$$f_{ijH} = \begin{cases} 1, & \text{the bearer } j \text{ in the base sation } i \text{ was not active in the previous frame} \\ \prod_{h=H_{Jij}}^{H_{Fij}} \prod_{k=1}^{K(h)} u_{hij}(k), & \text{the bearer } j \text{ was active in the previous frame} \end{cases} \quad (3)$$

In the above formula (3) the factor

K(h) represents the number of power control instructions of the fast power control during a frame h, $H_{1ij}$ refers to the first frame of the period considered in the calculation, and $H_{Fij}$ refers to the frame preceding the beginning frame (frame H) in a continuous transmission of the bearer j of the base station i, i.e. when said bearer has been active in the frames $\{H_{1ij}, H_{2ij}, \ldots, H_{Fij}\}$, and $u_{hij}(k)$ is the k:th power control instruction of the h:th frame ($h \in \{H_{1ij}, H_{2ij}, \ldots, H_{Fij}\}$), where generally $$u_{hij}(k) = \begin{cases} \text{step up} & \text{if the power is increased} \\ & \text{at the } k\text{:th power control action} \\ \text{step down} & \text{if the power is decreased} \\ & \text{at the } k\text{:th power control action} \end{cases} \quad (4)$$

As mentioned above in this patent application, the effect of the fast fading can be taken into consideration by very many different statistical quantities. The term $f_{ijH}$ representing the control history can be generated in the manner according to formula (3), and moreover also as defined by the following formulas (5) and (6) or the formulas (5) and (7):

$$f_{ijH} = \begin{cases} g\left(\dfrac{P_{Rx}}{P_{Tx}}\right), & \text{the bearer } j \text{ in the base station } i \text{ was not active} \\ & \text{in the previous frame, or the control history} \\ & \text{of the fast power control was otherwise not known} \\ \displaystyle\prod_{h=H_{1ij}}^{H_{Fij}} \prod_{k=1}^{K(h)} u_{hij}(k), & \text{the bearer } j \text{ was active in the previous frame} \end{cases} \quad (5)$$

where the function g is for instance given by the formula (6) below:

$$g\left(\dfrac{P_{Rx}}{P_{Tx}}\right) = \begin{cases} \dfrac{1}{n}, & \text{when} \dfrac{P_{Rx}}{P_{Tx}} \geq n L_{ij} \\ \left(\dfrac{P_{Rx}}{P_{Tx}}\right)^{-1} L_{ij}, & \text{when} \dfrac{L_{ij}}{n} \leq \dfrac{P_{Rx}}{P_{Tx}} \leq n L_{ij} \\ n, & \text{when} \dfrac{P_{Rx}}{P_{Tx}} < \dfrac{L_{ij}}{n} \end{cases} \quad (6)$$

The function g can also for instance be given by the formula (7):

$$g\left(\dfrac{P_{Rx}}{P_{Tx}}\right) = \left(\dfrac{P_{Rx}}{P_{Tx}}\right)^{-1/n} L_{ij} \quad (7)$$

In the above formulae the factor
n is a constant factor, n>1,
$P_{Rx}$ represents the received signal strength, and
$P_{Tx}$ is the total transmit power of a corresponding signal, such as the pilot signal, transmitted by the own base station during the same period.

A suitable value for n is for instance 2. If the value n=2 is used in the formula (6), then a change in the signal strength caused by fast fading can have an effect which at most doubles or halves the link gain estimate.

The term $f_{ijH}$ representing the control history can be formed for instance also in the following way:

$$f_{ijH} = \begin{cases} 1, & \text{the bearer } j \text{ in the base sation } i \text{ was not active} \\ & \text{in the previous frame} \\ \left(\dfrac{\gamma_{ij}}{\text{SIR\_rx}}\right)^{1/n}, & \text{the bearer } j \text{ was active in the previous frame} \end{cases} \quad (8)$$

In formula (8) the factor n>1. A suitable value of the factor n is for instance 4. Although the term $f_{ijH}$ in this description is called a term representing the control history, it is observed here that regarding the invention said term is intended to represent a quantity, which in some way at least partly represents the effect of a fast fading experienced by different bearers.

In the alternative term (in $f_{ijH}$) describing the control history of active packets presented in the formula (8) SIR_rx represents the SIR value observed during the previous frame (frame $H_{Fij}$), or for instance the detected average SIR value of the frames $\{H_{1ij}, H_{2ij}, \ldots, H_{Fij}\}$. Thus it is then assumed that the fast fading occurring in the previous frames is included as an average in the calculation of the new transmit power so that the transmit power obtained through the link gain is corrected towards the SIR target level on the basis of the detected SIR.

The above presented formulae (3), (5), (6), (7) and (8) are only exemplary, and the invention is not limited to the practice expressed in them in order to consider a changed transmit power of the transmission caused by fast fading.

The control history can further be observed for instance in the following way by utilising both the calculation method according to the formula (3) and the calculation method according to the formula (5). The factor $f_{ijH}$ can be calculated both according to the formula (3) and the formula (5), and the maximum of the absolute values of these two intermediate results can be used as the scaling factor $f_{ijH}$ in the formula (2). Thus for instance, if the formula (3) gives $f_{ijH} \approx 2$, and the formula (5) gives $f_{ijH} \approx 1.6$, and the maximum rule is utilised, then the value of the final scaling factor $f_{ijH}$ is 2. As the scaling factor in the formula (2) it is also possible to use the minimum of the mentioned two intermediate results or a combination defined in some other way.

All quantities in the formulae (2), (3), (5), (6), (7) and (8) are expressed as absolute values, and not as dB-values.

In the calculation formula (2) of the SIR values a possible way to realise the idea of this invention was presented as including the control history of the fast power control caused by fast fading during the previous frames in the calculation of the initial transmit powers of a new frame, so that the link gain to the own base station is divided by the control history. Thus, if the fast power control uses for instance the so called delta control where the step size is constant in absolute units, then the scaling factor of the link gain caused by the control history of the fast power control during the previous frame can be generated in absolute units for instance in the following way:

$$f_{ijH} = \prod_{h=H_{1ij}}^{H_{Fij}} \prod_{k=1}^{K} u_{hij}(k) = a^{s-t} \quad (9)$$

and in dB-units for instance in the following way:

$$f_{ijH} = \sum_{h=H_{1ij}}^{H_{Fij}} \sum_{k=1}^{K} u_{hij}(k) = (s-t) \cdot 10 \cdot \log_{10}(a) \text{dB} \quad (10)$$

where s is the number of power increments of the fast power control performed in the previous frame t is the number of power decrements of the fast power control performed in the previous frame a is the step size, and K is the number of control steps in the previous frame.

Here it must be observed that both the step size a and the number K of power control instructions from the power control during one frame can vary from one frame to another.

An example of how the output powers of different bearers can be determined is discussed below. The formula (2) gives:

$$\left(\frac{G_{ij}}{\gamma_{ij}} - \alpha\right) P_{ij} = \alpha \sum_{\substack{l=1 \\ l \neq j}}^{No\_MS_i} P_{il} + \sum_{\substack{m=1 \\ m \neq i}}^{No\_BS} \frac{\tilde{L}_{mij}}{\tilde{L}_{ij}} \sum_{n=1}^{No\_MS_m} P_{mn} + \frac{1}{\tilde{L}_{ij}} P_N \quad (11)$$

which can be expressed in a matrix form as follows:

$$\lambda p = Ap + aP_N \quad (12)$$

where p is a matrix containing the output powers of the bearers, which is presented in more detail in the formula (13), A is a square matrix according to the formula (14) formed by sub-matrices according to the formula (15), a is a link gain vector according to the formula (16), and X is diagonal matrix, which is defined in the formulae (17) and (18). The matrix A is a matrix of interference effects, i.e. it contains mainly the interactions of each base station to the other base stations and to the mobile stations controlled by the other base stations.

$$p = \quad (13)$$
$$[P_{1,1} \ldots P_{1,No\_MS_1} \ldots P_{No\_BS,1} \ldots P_{No\_BS,1} \ldots P_{No\_BS,No\_MS_{No\_BS}}]^T$$

$$A = \begin{bmatrix} A_{1,1} & \ldots & A_{1,No\_BS} \\ M & O & M \\ A_{No\_BS,1} & \ldots & A_{No\_BS,No\_BS} \end{bmatrix} \quad (14)$$

$$A_{im}(j,k) = \begin{cases} 0, & i = m \land j = k \\ \alpha, & i = m \land j \neq k \\ \frac{\tilde{L}_{mij} f_{Hij}}{L_{ij}}, & i \neq m \end{cases} \quad j = 1, \ldots, No\_MS_i, k = No\_MS_m. \quad (15)$$

$$a = \left[\frac{f_{H11}}{L_{1,1}} \Lambda \frac{f_{H,1,No\_MS_1}}{L_{1,No\_MS_1}} \Lambda \frac{f_{H,No\_BS,1}}{L_{No\_BS,1}} \Lambda \frac{f_{H,No\_BS,No\_MS_{No\_BS}}}{L_{No\_BS,No\_MS_{No\_BS}}}\right]^T \quad (16)$$

For instance the definition of the term $f_{ijH}$ representing the control history according to the formula (3) can be used in the formula (16).

$$\lambda = \begin{bmatrix} \lambda_1 & 0 & 0 \\ & O & 0 \\ 0 & 0 & \lambda_{No\_BS} \end{bmatrix} \quad (17)$$

In the formula (17) the factors $\lambda_i$ are diagonal sub-matrices:

$$\lambda_i(j,k) = \begin{cases} \frac{G_{ij}}{\gamma_{ij}} - \alpha, & j = k \\ 0, & j \neq k \end{cases}, j = 1 \ldots No\_MS_i, k = 1 \ldots No\_MS_i \quad (18)$$

A new open loop power vector can be calculated with the aid of the above formulae according to formula (19):

$$p = (\lambda - A)^{-1} aP_N \quad (19)$$

Due to reasons relating to the calculation it may in practice be advantageous to limit the number of small non-zero elements in the matrix A. This can be done for instance so that first the largest element of the matrix is found, and then all such elements, which are for instance 30 dB, or in absolute values 1000 times smaller than the largest element, are replaced by zeroes. Then the dynamics of the matrix A is limited to 30 dB.

Another alternative to simplify the matrix A is to replace certain sub-matrices $A_{nm}$ (n, m=1, 2, ..., No_BS) by zero-matrices where all elements are zeroes. This can be made for instance in those sub-matrices, for which the corresponding base stations n and m are not neighbouring base stations. Alternatively this can be made for instance in those sub-matrices, in which the number of non-zero elements is less than a certain threshold value after the above described limiting of the dynamics. Advantageously about 10% of the number of elements in the sub-matrix could be selected as such a threshold value. A further alternative could be to reset those sub-matrices $A_{nm}$, whose corresponding base station m has a link gain to the base station n has an absolute value which is at least as high as the power control dynamics of the base station n, or by a certain parameter value higher than the power control dynamics.

A third alternative way to simplify the matrix A is to make the matrix into a diagonal matrix, i.e. to replace the sub-matrices $A_{nm}$ (n, m=1, 2, ..., No_BS) by zero-matrices, where n≠m. Then the power vector is solved for each base station so that only the interference caused by the own base station is taken into consideration instead of the total interference.

The matrix A can also be simplified by resetting elements of certain rows or columns. For instance, rows or columns having elements with values below a certain limit can be selected as resettable rows or columns.

The above described ways to simplify the matrix A reduce the required amount of calculation, whereby the calculation is faster.

In practice the power values in use have certain lower and upper limits, so that the results provided by the calculation must be limited to a certain power range. If a component of the power vector must be varied, then it is necessary to check which effect it has on the SIR value of the respective transmitted packet/bearer, or on some other corresponding value representing the interference level. The check can be made by calculating the SIR values $\gamma_r$ at the revised power levels, for instance according to the formula (20) below:

$$\gamma_r = \text{div}(GP, (A+I)P + aP_N) \quad (20)$$

where div(.) denotes division element by element, and G is a diagonal matrix containing the process gains. If the SIR values $\gamma_r$ obtained with the revised power levels are unacceptable, then the network system can arrange the traffic, for instance by moving packets of low priority levels to be transmitted in later frames, and by recalculating the power levels. If the SIR values $\gamma_r$ are acceptable, then the calculated power levels can be used.

As a criterion for the utilisation of the calculated power values it is also possible to use other parameters than the above mentioned SIR values. The output power vector can be calculated several times with slightly different initial values, for instance with different SIR target levels, and the output power vector to be used is selected according to a desired criterion or a desired set of criteria. Another exemplary alternative for varying the initial values of the calculation of the output power vector is to reduce the bit rate of those transmissions, which during the previous frames had on the average the highest transmit power per correctly received bits, or to interrupt the transmission of such a transmission for the period of the beginning frame. For instance the ratio of the total transmit power to the number of bits transmitted during one frame can be used as the quantity to be minimised in the selection of the output power vector to be used. For instance the ratio of the transmit power of the active bearers to the number of correctly bits can also be used as the quantity to be minimised. The invention does not in any way limit the optimisation target used here nor the optimisation method used for the actual optimisation in addition to the power control method presented in this application. It is for instance possible to select from the calculated output power vectors that one which has the lowest sum of the output powers. As another example of the target for the optimisation of the output powers there can be presented a maximisation of the SIR values weighted by the price categories or profit categories of the different bearers, which is a useful parameter if the considered mobile system on the traffic level monitors the costs caused by each bearer and the payments received from the users of the service. Further we can mention as an example the maximisation of the SIR values weighted by the importance categories of the bearers, which is suitably used in a mobile system where each user can be assigned importance categories concerning all bearers of the user, or concerning each bearer of the user. Thus a system of this kind could for instance guarantee the throughput of authority traffic despite congestion peaks. With the aid of importance categories for different packets or bearers it is also possible to create different service categories for the users, for instance according to the longest allowable delay, whereby the packet's importance class is automatically raised when the longest allowable delay is approached, until the packet gets through. As a further example we can mention the maximisation of the throughput capacity for data communication. A desired combination of these or other single targets could also be regarded as the optimisation target. As is seen from these examples, the traffic can be managed according to many different targets with the aid of the control method according to the invention, taking into consideration the very different special requirements of different bearers.

The power vector can also be used as an aid in admission control and load control in order to decide whether it is worth to give service to a bearer trying to start at a certain moment, whether it is worth to let said bearer wait for its turn to be transmitted, or whether it is better worth regarding the system capacity and stability to lower the SIR target level for a connection or to increase the process gain (i.e. decrease the bit rate). Then the ratio of the transmit power given by the calculated power vector to the transmitted bits can be used as the selection quantity; or the ratio of the transmit power given by the calculated power vector to the correctly received bits during the previous frames can be used as the selection quantity. The ratio of the transmit power to the correctly received bits during the previous frames represents the average amount of required transmit power for the correct reception of a bit. One possible selection quantity is also obtained by multiplying the transmit power of a transmission for the number of transmitted bits with a function having as the argument the ratio of the SIR target level to the observed SIR ($SIR_{target\_level}/SIR$), which is calculated over the averaging period used in the calculation of the transmit powers. The calculation of the selection quantity is illustrated in the formula (21).

$$\text{Criterion} = \frac{P_{Tx}}{\text{number\_of\_bits}} h_1[SIR, SIR_{target\_level}] \quad (21)$$

The function $h_1$ in the formula (21) can for instance be a function according to the formula (22).

$$h_1 = \left(\frac{SIR_{target\_level}}{SIR}\right)^{1/n} \quad (22)$$

In the formula (22) the factor $n \geq 1$. A suitable value of the factor n is for instance 4. The selection quantity can also be calculated according to the formula (23):

$$\text{Criterion} = \frac{P_{Tx}}{\text{number\_of\_bits}} h_2[SIR_{min}, SIR_{target\_level}] \quad (23)$$

The function $h_2$ in the formula (23) can for instance be a function according to the formula (24).

$$h_2 = \left(\frac{SIR_{min}}{SIR_{target\_level}}\right)^{1/n} \quad (24)$$

In the formula (24) the factor $n \geq 1$. A suitable value of the factor n is for instance 1 or slightly greater than 1. In the formula (24) the quantity $SIR_{min}$ denotes the lowest value among the SIR target levels $SIR_{target\_level}$ of the compared transmissions. If for instance a decision is made between two transmissions, which one of them should have a lower bit rate and/or a lower SIR target value when the first transmission has a $SIR_{target\_level}$ of 2 and the second transmission has a $SIR_{target\_level}$ of 4, then according to the formula (24) the function $h_2$ will get the value 0.5 for the first transmission and the value 1 for the second transmission, when n=1. In addition to the number of bits and the transmit power also the value of the quality target ($SIR_{target\_level}$) for the transmissions is in this way taken into consideration. When the selection quantity is determined the function $h_2$ according to the formula (24) has that effect that in addition to the correctly received bits also that SIR target level is explicitly taken into consideration, at which said bits are intended to be received.

When the SIR is calculated it is, however, worthwhile to use a limitation of the highest and lowest values. For instance, if the SIR value is below a certain predetermined lower limit, then the bit rate of this connection is lowered more than for a connection having a SIR value over this lower limit. If the SIR value is over the higher limit, then the SIR value is replaced by the higher limit value.

All quantities in the formulae (21), (22), (23) and (24) are expressed in absolute units, and not in dB-units.

In an overload situation it is worthwhile to first remove from the cluster of connections obtaining service those connections which have the highest transmit power per the received number of bits. Alternatively the bit rate of such a connection can be reduced. In an overload condition it is worthwhile to reduce the system load by low-ering the SIR target level and/or the bit rate for transmissions selected with the method according to the invention so much that the load is kept at a desired level. In an underload condition, when the load is lower than desired, it is possible to select with the aid of the power vector calculation which connection most advantageously can have an increased bit rate, i.e. a lower process gain. Then such a connection, which has the lowest transmit power for a certain number of transmitted bits, is selected as the controlled connection. In undersold situations, when the power vector calculated in this invention is useful, i.e. when the powers provided by it are within the allowed limits, then with the method according to the invention it is possible to select for the transmission also such a transmission for which the power vector gives the lowest transmit power in relation the bits to be transmitted, or in relation to the correctly received bits during the previous frames.

In underload and overload conditions the SIR target levels and/or the bit rates are advantageously increased in an underload condition and reduced in an overload condition particularly for such transmissions which have a high transmit power in relation to the correctly received bits. As transmit powers it is possible to use for instance the powers given by the power vector according to the invention or the average transmit powers of previous transmissions, the last transmit power given by the closed loop, or the normal transmit power based on the open loop link gain. One possible embodiment is to take with the aid of different determination methods for instance the maximum or the average of the above mentioned transmit power values, and to use it in the comparison quantity of the load control, whereby the comparison quantity can for instance be the ratio of the transmit power to the average number of correctly received bits. The power vector can be used for instance also as an accessory for the load control in order to determine the values of the comparison quantities of the load control for different transmissions.

For the sake of illustration we repeat again in formula (25) how a power vector is mathematically created over a period of two frames. In the formula $P_{t,TR}(s)$ denotes the transmit power of an RT packet belonging to an activated bearer in frame s (here s=1, 2) in the first active frame of the bearer. $\Delta P_{m_{s,t},NRT}(s)$ again denotes the change in the transmit power of the $m_{s,t}$:th NRT packet belonging to a bearer activated in the frame s (here s=1, 2), whereby the change is made in the considered frame due to the fast power control and to a changed interference situation. The first frame contains $n_{1,1}$ RT-packets and $m_{1,1}$ NRT-packets, of which $n_{1,2}$ RT-packets and $m_{1,2}$ NRT-packets are active also in the second frame. The first sub-index denotes the frame in which the bearer of said packet has been activated, and the second sub-index denotes the considered frame. The second frame will include $n_{2,2}$ RT-packets and $m_{2,2}$ NRT-packets belonging to new bearers.

$$\begin{bmatrix} P_{1,RT}(1) \\ P_{2,RT}(1) \\ M \\ P_{n_{1,1},RT}(1) \\ P_{1,NRT}(1) \\ M \\ P_{m_{1,1},NRT}(1) \end{bmatrix} \Rightarrow \begin{bmatrix} P_{1,RT}(1) + \Delta P_{1,RT}(1) \\ M \\ P_{n_{1,2},RT}(1) + \Delta P_{n_{1,2},RT}(1) \\ P_{1,RT}(2) \\ M \\ P_{n_{2,2},RT}(2) \\ P_{1,NRT}(1) + \Delta P_{1,NRT}(1) \\ M \\ P_{m_{1,2},NRT}(1) + \Delta P_{m_{1,2},NRT}(1) \\ P_{1,NRT}(2) \\ M \\ P_{m_{2,2},NRT}(2) \end{bmatrix} \quad (25)$$

In the optimisation of the results of the power control according to the method according to the invention a mobile system can use many different ways to arrange the traffic. For instance, the system can postpone the transmission of certain packets with low priority. The system can also for instance reduce the transmission rate or the transmit power of certain bearers.

The power control method according to the invention can also be used for different traffic management purposes. The method according to the invention can be used for instance for the load control of a controlled transmission cluster of the bearers. In an embodiment of this type the effect of a beginning transmission on the total power is determined, and if the total power limit is exceeded the starting of the transmission of said transmission can be denied, or the traffic of the controlled transmission cluster of the bearers can be arranged so that the transmission of the beginning transmission can be allowed. Thus the method according to the invention can be used generally to apply different traffic arrangement alternatives for the traffic management.

The method according to the invention can also be applied in connection with the so called macro diversity combination. Macro diversity combination means a practice where more than one base station provides service to the same mobile station. Then each base station providing service transmits a sub-signal to the mobile station, and the mobile station adds the received sub-signals. Then each base station can use a lower transmit power than in a case where said mobile station uses only one base station. Due to the lower transmit power the other mobile stations of each base station detect a lower interference level.

Figure 2:
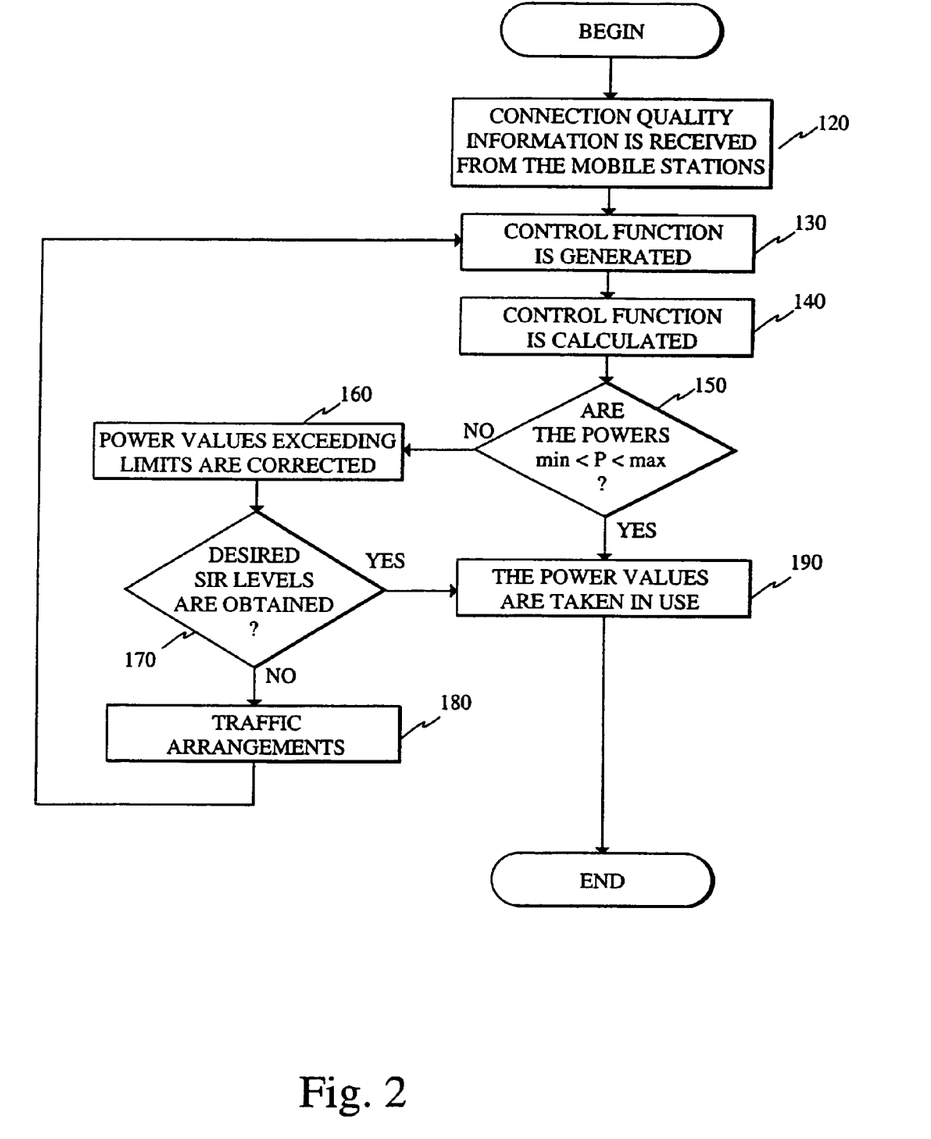
FIG. 2 illustrates the operation of the method according to a preferred embodiment of the invention.

FIG. 2 illustrates the flow diagram of the method according to the a preferred embodiment of the invention. This example illustrates a possible manner of action in a situation, where the controlled cluster is one base station and the mobile stations in its area. This example further illustrates such an embodiment according to the invention, where a check is made whether the values of the output powers obtained as a result of the calculation are within certain limits. At first the connection quality information is received 120 from the mobile stations. The reception of the connection quality information is a part of the common operation of the prior art mobile system, so this method step is drawn in the FIG. 2 only for the sake of illustration. Then a control function is generated 130 on the basis of at least the connection quality information and the control history of the power levels of the mobile stations. For instance the function according to the formula (19) or another corresponding function can be used as the control function. In the next step the control function formed in the previous step is calculated 140, and the results of this calculation provides new values for the output powers of the controlled transmissions. Then it is checked 150 that each calculated output power value is between the minimum and maximum values suitable for each transmission. If all values are within the allowed limits said power values are applied 190.

If all calculated output power values were not within the allowed limits the operation continues according to FIG. 2 in the following way. The output power values exceeding the allowed limits are replaced 160 by the maximum allowed value for each transmission, and correspondingly the values below the lower limit of the initial values are replaced by the lower limit. Then a check is made 170 whether the checked values fulfil the desired criteria, i.e. in the example of FIG. 2 a check is made 170 whether the desired SIR values are obtained with the revised values. In this case the check can be made for instance according to the formula (20). If the desired SIR levels are obtained, then the checked values can be applied 190. If the desired SIR values are not obtained, the traffic arrangements 180 are made, for instance by delaying the transmission of some packets with low priority to later frames. After these arrangements the process returns to the step for generating 130 the control function.

According to a preferred embodiment of the invention the calculated and/or checked power values can be applied even if they do not fulfil the desired SIR levels. This may be the case if no traffic arrangements can provide a solution with which the desired SIR levels can be obtained. In such a case it is most favourable to arrange the output powers so that the SIR levels of the bearers with the highest priority are reached as well as possible, and by leaving the SIR levels of some low priority bearers below the target level.

Figure 3:
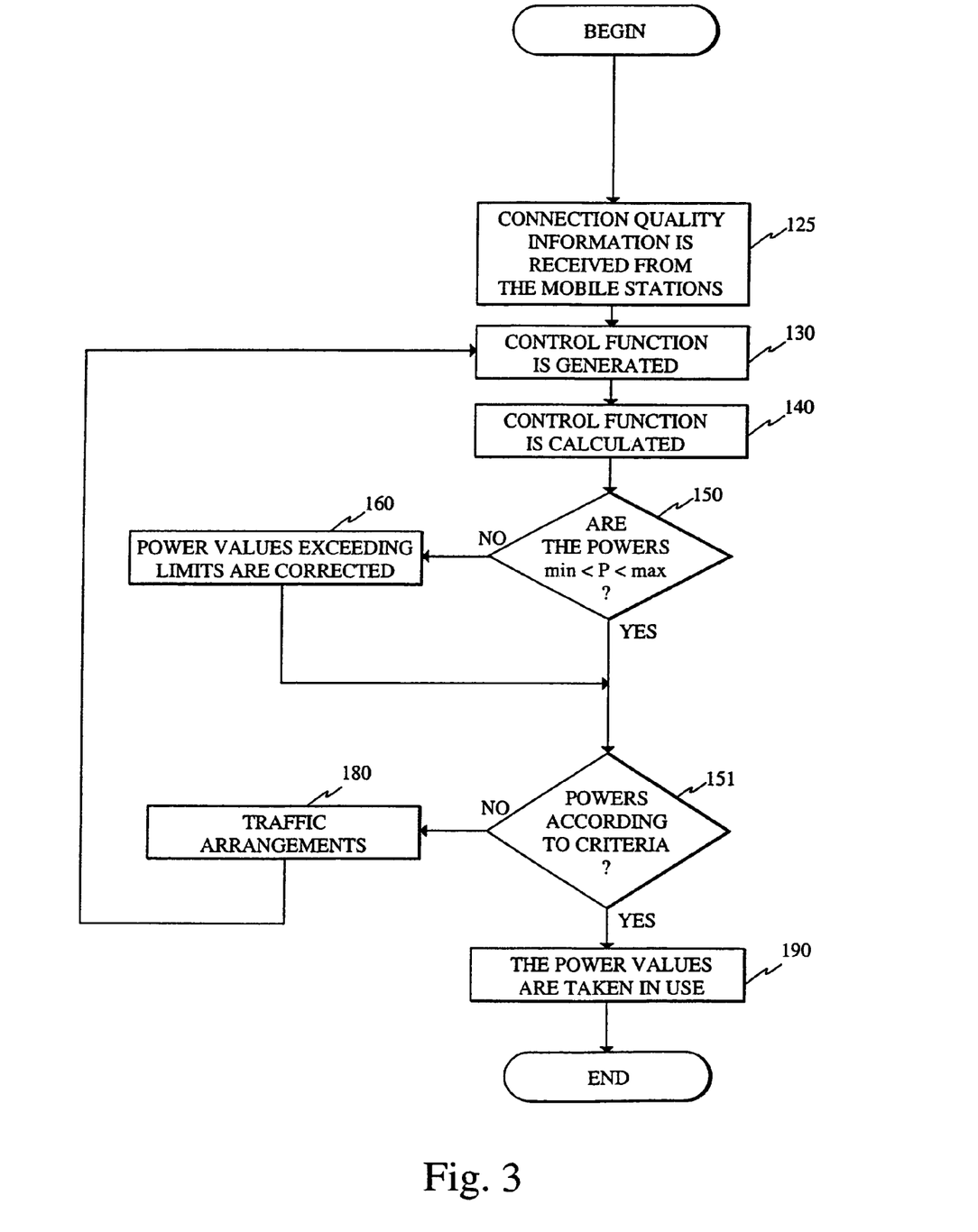
FIG. 3 illustrates the operation of the method according to another preferred embodiment of the invention.

The FIG. 3 illustrates the operation of the method according to a preferred embodiment of the invention in the form of a flow diagram. This example illustrates a possible operation mode in a situation where the controlled cluster includes more than one base station and the mobile stations in their areas. This example further illustrates an embodiment according to the invention where a check is made whether the output power values obtained as a result of the calculation are according to the desired optimisation targets. At first there is received 125 the connection quality information and the information about the control history of the mobile station power control from the base stations taking part in the power control management. Then the control function is generated 130 on the basis of at least the connection quality information and the control history of the power levels of the mobile stations. For instance the function according to the formula (19) or another corresponding function can be used as the control function. In the next step the control function formed in the previous step is calculated 140, and the results of this calculation provides new values for the output powers of the controlled transmissions. Then a check is made 150 that each calculated output power value is between the minimum and maximum values suitable for each transmission. If all output power values are within the allowed limits the operation is continued at step 151. If all values are not within the allowed limits, then those values outside the allowed limits are replaced by allowed values, for instance in a manner according to the step 160 which was described in connection with the description of FIG. 2. In step 151 there is made a check that the calculated output power values are in accordance with the desired criteria or optimisation targets. The power values are taken in use 190 if the power values are according to the criteria. If the power values do not fulfil the required criteria, then the traffic is arranged 180 in order to fulfil the desired optimisation targets, and the process returns to the step 130 for generating the control function.

The invention is not limited to any certain optimisation target, but in the inventive method according to the example in FIG. 3 and in other embodiments of the invention it is possible to apply an optimisation target according to the actual requirements. As an optimisation target it is for instance possible to use the maximisation of the SIR values, which are weighted with the importance category of the bearers, or some of the other above mentioned targets. The invention is also not limited to any certain way to arrange the traffic in order to obtain the desired optimisation target, but the arrangement method is preferably selected according to the optimisation target. Thus the invention is not limited to a certain optimisation method which formed by optimisation targets and the arrangement method.

In a preferred embodiment of the invention the new power levels obtained as the result of the calculation are not directly applied in all bearers which were active in previous frames, but there is first made a check whether the change caused by the calculation is greater than a certain predetermined limit. If the change of the bearer's transmit power is less than said limit the transmit power of the bearer in question is not changed, whereby the automatic power control of the mobile system can control the transmit power when the new frame has begun. In an embodiment of this kind the output power is changed only if the new output power calculated with the method according to the invention is lower or higher than the old output power by more than said limit. The advantage of an embodiment of this kind is a lower need for control signalling.

In a preferred embodiment of the invention the base station neighborhood can be taken into consideration in a simpler manner than that presented above. The output powers of the base stations and mobile stations of the desired neighborhood can be taken into consideration by adding their estimated impact to a noise term, such as to the term $P_N$ of formula (19).

As described above, the method according to the invention enables the powers of several mobile stations to be controlled in common in the same process. Such a collective power control is useful in situations where the traffic statistics of the cell is changing. When a mobile station using a high data transmission rate initiates its traffic it causes at the same time a substantial common factor in the power control of other users. In the same way, when a mobile station using a high data transmission rate terminates its connection the power levels of other users can be set at a substantially lower level than during the high data transmission rate traffic. A simultaneous fast reduction of the power to several mobile stations is advantageous not only regarding the interferences in the own cell, but also regarding the interferences caused to the neighbouring cells. Often the power control of several mobile stations or bearers can be made in clusters, whereby the power control instructions given to the respective cluster have a similar effect on all bearers of said cluster. The common power control of a certain cluster can for instance use the cluster power control bits defined for a common control channel, which bits are separated from the normal power control of each bearer. The common power control can be realised with a larger step size than the power control of each bearer, so that there is obtained a rapid response to the change.

In a preferred embodiment of the invention the bearers taking part in the common power control can be selected according to their traffic situation. For instance, bearers transmitting packet traffic can automatically belong to a certain cluster, in which the output powers of the bearers are at least partly controlled with the aid of cluster instructions. In an embodiment of this kind each mobile station observes the cluster power control instructions determined by its traffic situation. Then the cluster of a mobile station or bearer is automatically changed when there is a change in the traffic situation. In addition to the cluster instructions a mobile station can also observe power control instructions intended only for the respective bearer or mobile station.

Figure 4:
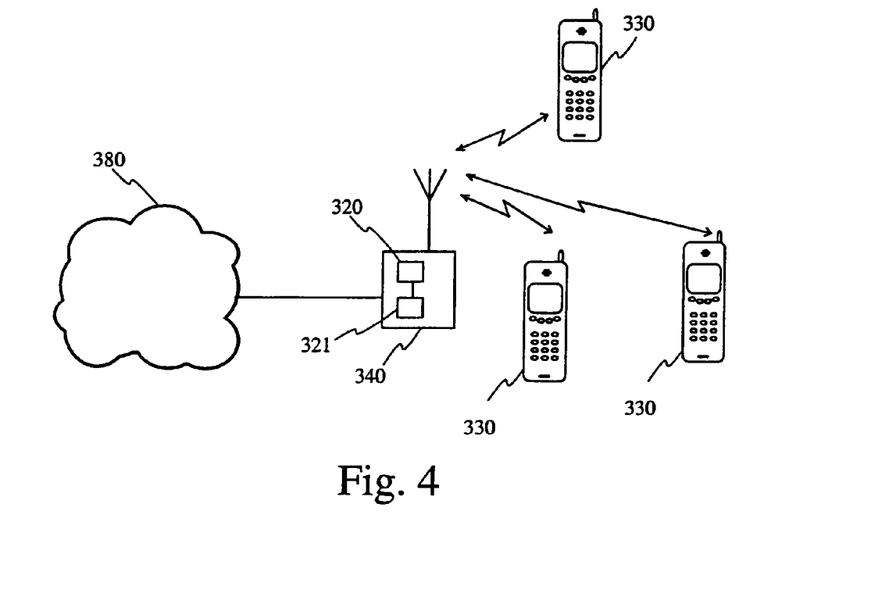
FIG. 4 illustrates a preferred embodiment of the invention, where the base station comprises means for realising the control method according to the invention.

The system realising the power control method according to the invention may be realised in many different ways. In a preferred embodiment of the invention the calculation method according to the invention is performed by a processor of such a system, and the functions of the processor are controlled by software stored in memory means. FIG. 4 illustrates one such embodiment of the invention. The figure shows a base station 340 connected to the rest of the mobile system 380, and mobile stations 330 communicating with the base station. In order to realise the power control method according to the invention the base station 340 contains a processor 320 and a memory means 321.

Figure 5:
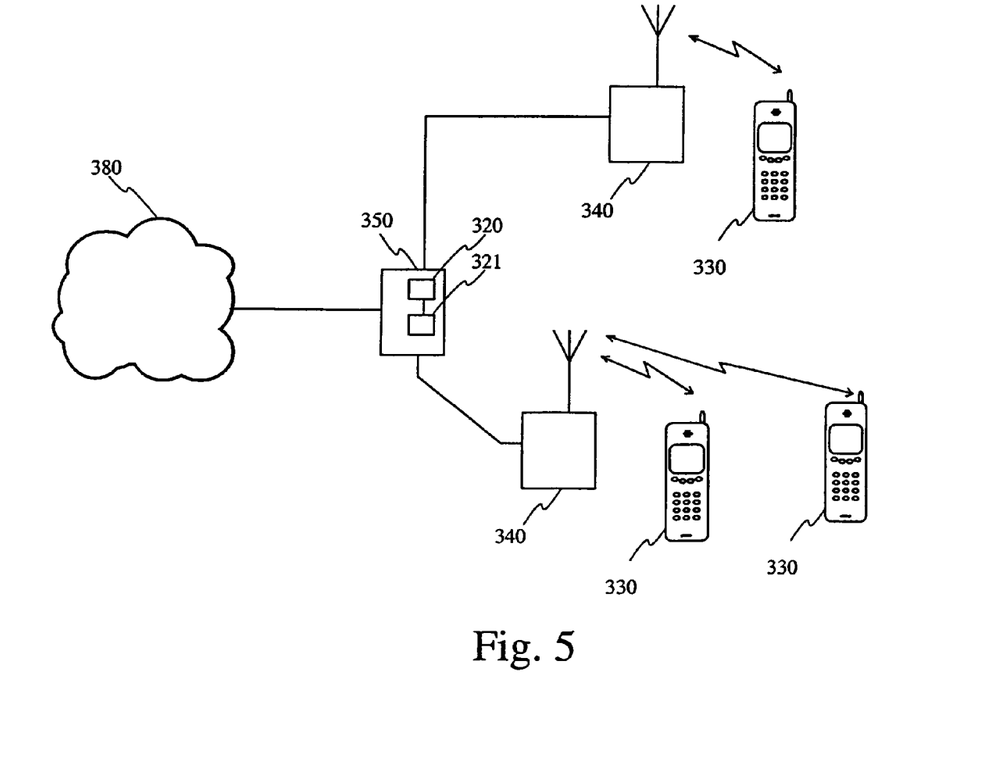
FIG. 5 illustrates another preferred embodiment of the invention, where the means required to realise the control method according to the invention are located in the base station controller.

FIG. 5 illustrates another preferred embodiment of the invention where the means 320, 321 controlling the power control are located in the base station controller 350 which controls the base stations 340. The base station controller 350 communicates with the rest of the mobile system 380. FIG. 4 shows further mobile stations 330 communicating with the base stations 340.

According to a further advantageous embodiment of the invention, the calculation of the power vector can be performed in a simplified way. This is described in detail with reference to formulas (26) to (37). In this exemplary embodiment, the calculation of the SIR values can be made for instance in the following way:

$$\gamma_{ij} = \frac{G_{ij} L_{ij} P_{ij}}{\alpha \boxminus_{ij} \sum_{\substack{l=1 \\ m \neq i}}^{No\_MS_i} P_{il} + \sum_{m=1}^{No\_BS} \tilde{L}_{mij} + \sum_{n=1}^{No\_MS_m} P_{mn} + P_N} \quad (26)$$

where $\gamma_{ij}$ is the target SIR level of the packet or bearer j of the base station i, $\tilde{L}_{mij}$ is the link gain between the base station m and the terminal relating to the bearer j of the base station i, $P_{ij}$ is the transmit power of the packet/bearer j of the base station i, $G_{ij}$ is the process gain of the packet/bearer j of the base station i, No_BS is the number of base stations in the base station neighborhood controlled by one base station controller, $No\_MS_m$ is the number of active bearers of the base station m (m=1, 2, . . . , No_BS), $L_{ij}$ is the link gain between the base station i and the terminal relating to its bearer j, $P_N$ is a noise term, and α is a factor representing the orthogonality of the codes of the own cell, α∈[0,1]. The value of the factor α is one if the codes of the own cell are fully unorthogonal. The value of the factor α is zero, if the codes of the own cell are fully orthogonal.

Formula (26) can also be expressed in the following form:

$$\gamma_{ij} = \frac{G_{ij} L_{ij} P_{ij}}{\alpha \boxminus_{ij} \left( \sum_{l=No\_MS\_old_i+1}^{No\_MS_i} P_{il} + \sum_{l=1}^{No\_MS\_old_i} P_{il} \right) +} \quad (27)$$

$$\sum_{\substack{m=1 \\ m \neq i}}^{No\_BS} \tilde{L}_{mij} \left( \sum_{n=No\_MS\_old_m+1}^{No\_MS_m} P_{mn} + \sum_{n=1}^{No\_MS\_old_m} P_{mn} \right) + P_N$$

where $No\_MS\_old_k$ is the number of old bearers of the base station k. The transmission powers of the new bearers of base station k are denoted as $P_{k,No\_MS\_old_k+1}$, $P_{k,No\_MS\_old_k+2}$, K, $P_{k,No\_MS_k}$ where $No\_MS_k$ denotes the number of all bearers of base station k including both old and new bearers.

From formula (27) one can obtain $$\left( \frac{G_{ij}}{\gamma_{ij}} - \alpha \right) P_{ij} = \left( \alpha \sum_{\substack{l=No\_MS\_old_i+1 \\ l \neq j}}^{No\_MS_i} P_{il} + \sum_{\substack{m=1 \\ m \neq i}}^{No\_BS} \frac{\tilde{L}_{mij}}{L_{ij}} \sum_{n=No\_MS\_old_m+1}^{No\_MS_m} P_{mn} \right) + \quad (28)$$

$$\left( \alpha \sum_{l=1}^{No\_MS\_old_i} P_{il} + \sum_{\substack{m=1 \\ m \neq i}}^{No\_BS} \frac{\tilde{L}_{mij}}{L_{ij}} \sum_{n=1}^{No\_MS\_old_m} P_{mn} \right) + P_N$$

which can be expressed in matrix form as $$\lambda_1 p_1 = A_1 p_1 + a_1 \quad (29)$$

where $p_1$ is a matrix containing the output powers of the bearers, which is presented in more detail in the formula (30), $A_1$ is a square matrix according to the formula (31) formed by sub-matrices according to the formula (32), $a_1$ is a link gain vector according to the formula (33), and $\lambda_1$ is a diagonal matrix, which is defined in the formulae (34) and (35). The matrix $A_1$ is a matrix of interference effects, i.e. it contains mainly the interactions of each base station to the other base stations and to the mobile stations controlled by the other base stations.

$$p_1 = \quad (30)$$

$$[\ _{d_1+1} \ \cdots \ P_{1,No\_MS_1} \ \cdots \ P_{No\_BS,No\_MS\_old_{No\_BS}+1} \ \cdots \ P_{No\_BS,No\_MS_{No\_BS}}]^T$$

which includes only the transmission powers of the new bearers, $$A_1 = \begin{bmatrix} A_{1,1} & \cdots & A_{1,No\_BS} \\ M & O & M \\ A_{No\_BS,1} & \cdots & A_{No\_BS,No\_BS} \end{bmatrix} \quad (31)$$

$$A_{im}(j,k) = \begin{cases} 0, & i = m \wedge j = k \\ \alpha, & i = m \wedge j \neq k \\ \dfrac{\tilde{L}_{m,i,No\_MS\_old_i+j}}{L_{i,No\_MS\_old_i+j}}, & i \neq m \end{cases} \quad (32)$$

where j=No_MS_old$_i$+1, . . . , No_MS$_i$, k=No_MS_old$_m$+1, . . . , No_MS$_m$.

$$a_1 = \begin{bmatrix} \alpha \sum_{l=1}^{No\_MS\_old_i} P_{1,l} + \sum_{m=2}^{No\_BS} \frac{\tilde{L}_{m,1,No\_MS\_old_1+j}}{L_{1,No\_MS\_old_1+j}} \sum_{n=1}^{No\_MS\_old_m} P_{mn} + \frac{1}{L_{1,No\_MS\_old_1+j}} P_N \\ M \\ \alpha \sum_{l=1}^{No\_MS\_old_{No\_BS}} P_{No\_BS,l} + \sum_{m=1}^{No\_BS-1} \frac{\tilde{L}_{m,No\_BS,No\_MS_{No\_BS}}}{L_{No\_BS,No\_MS_{No\_BS}}} \sum_{n=1}^{No\_MS\_old_m} P_{mn} + \frac{1}{L_{No\_BS,No\_MS_{No\_BS}}} P_N \end{bmatrix} \quad (33)$$

$$a_1 = \left[ \frac{1}{L_{4,1}} \wedge \frac{1}{L_{1,No\_new\_MS_1}} \wedge \frac{1}{L_{No\_BS,1}} \wedge \frac{1}{L_{No\_BS,No\_new\_MS_{No\_BS}}} \right]^T \quad (34)$$

$$\lambda_1 = \begin{bmatrix} \lambda_1 & 0 & 0 \\ & O & 0 \\ 0 & 0 & \lambda_{No\_BS} \end{bmatrix} \quad (35)$$

In the formula (35) the factors $\lambda_i$ are diagonal sub-matrices:

$$\lambda_i(j,k) = \begin{cases} 0, & j \neq k \\ \frac{G_{i,No\_MS\_old_i+j}}{\gamma_{i,No\_MS\_old_i+j}} - \alpha, & j = k \end{cases} \quad (36)$$

where j, k=No_MS_old$_i$+1, No_MS_old$_i$+, . . . 1, No_MS$_i$. A new open loop power vector can be calculated with the aid of the above formulae according to formula (37):

$$p_1 = (\lambda_1 - A_1)^{-1} a_1 \quad (37)$$

The initial transmission powers of new bearer can be calculated according to formula (37). Formula (37) can also be used for estimating the initial transmission powers for purposes of admission control, i.e. for estimating if the new bearers would create a too large increase in transmitted power, if admitted.

A power control system according to the invention can also be located in many different points of the mobile system. If the power control system controls only one base station and the transmissions of mobile stations in its area, then the power control is advantageously located in the respective base station. The power control system can also be located in the control unit of a communication network controlling one or more base stations, such as in a base station controller.

The power control method according to the invention has many essential advantages. With the aid of the power control method according to the invention the power levels of the transmissions starting at the beginning of a frame and the power levels of other transmissions can be controlled close to the optimum, which saves capacity at the radio interface and saves transmit power in the mobile stations. The fast power control controls the transmit powers to their correct values substantially faster than a prior art solution, because a possible deviation of the transmit power from the actual optimum value is substantially smaller than in prior art solutions.

The formulae presented in this application are only exemplary, and the invention is not limited to the power control methods according to the formulae presented here. To a person skilled in the art it is obvious that the method according to the invention can be realised by calculation formulae formed with very many different approximations.

The realisation of the invention in a packet switched CDMA system was described above, but however, the invention is not limited to a packet switched system. With the method according to the invention is also possible to manage the power control of a network based on circuit switched spread spectrum techniques in situations, where the transmission of a bearer is initiated or terminated. The method according to the invention is applicable in many different mobile system, such as in mobile systems of the so called third generation, which are base on a combination of the CDMA and TDMA technologies. Thus the invention is also applicable in such systems which only partly are based on the spread spectrum technique. The power control method according to the invention can also be used in TDMA systems.

Above the invention was described with reference to some of its preferred embodiments, but it is obvious that the invention can be modified in many different ways according to the inventive idea defined in the enclosed claims.

The invention claimed is:

1. A power control method comprising:
   determining the transmit power of more than one bearer at a time in a mobile system having at least one mobile station and at least one base station by:
   forming a control function at least partly on the basis of a quantity which at least partly represents a fast fading experienced by at least one bearer,
   calculating the control function in order to determine new output power values of said more than one bearer,
   generating an interference effect matrix which represents the mutual interference of different bearers, and
   inverting the generated interference effect matrix in order to form new power levels.

2. A power control method comprising:
   determining the transmit power of more than one bearer at a time in a mobile system having at least one mobile station and at least one base station by:
   forming a control function at least partly on the basis of a quantity which at least partly represents a fast fading experienced by at least one bearer,
   calculating the control function in order to determine new output power values of said more than one bearer,
   calculating more than one set of output power values,
   forming a utility function in order to select one set of output power values,
   selecting the set of output power values which minimizes the value of said utility functions, generating an interference effect matrix, which represents the mutual interferences of different bearers, and inverting the generated interference effect matrix in order to form new power levels.

3. A software code configured and stored in a processor readable medium, wherein the software code is configured to:

communicate at least partly on a spread spectrum technique configured for either at least one mobile station or at least one base station, define at least one bearer as a communication entity between the at least one base station and the at least one mobile station, the at least one bearer including variable factors containing transmission rate, delay, bit error rate and having an impact on the communication, form a control function at least partly on the basis of a quantity which at least partly represents the control history experienced by the at least one bearer, calculate the control function in order to determine transmit power values to be used for at least one of said bearers, determine the transmit power for more than one bearer when the transmission rate of the at least one bearer changes so that the control of said at least one of said bearers is arranged to impact the control of other bearers, generate an interference effect matrix, which represents the mutual interferences of different bearers, and invert the generated interference effect matrix in order to form new power levels.

4. A base station comprising:

a module configured to communicate at least partly on a spread spectrum technique for at least one mobile station and the base station, and wherein a bearer is defined as a communication entity between the base station and the at least one mobile station, the bearer including variable factors containing transmission rate, delay, bit error rate and having an impact on the communication, a generator to generate a quantity which at least partly depends on the control history experienced by at least one bearer, a device to determine the output power values for more than one bearer at least partly on the basis of said quantity, a controller to control the transmit power of at least one bearer on the basis of said transmit power values, said controller being so configured that when the transmit power of more than one bearer is configured to be determined when the transmission rate of at least one bearer changes, the controller to control the at least one of the bearers is configured to impact the control of other bearers, a generator to generate an interference effect matrix, which represents the mutual interferences of different bearers, and an inverter to invert the generated interference effect matrix in order to form new power levels.

5. A control unit comprising:

a module configured to communicate at least partly on a spread spectrum technique for at least one mobile station and at least one base station, and wherein a bearer is defined as a communication entity between the at least one base station and the at least one mobile station, the bearer including variable factors containing transmission rate, delay, bit error rate and having an impact on the communication, a generator to generate a quantity which at least partly depends on the control history experienced by at least one bearer, a device to determine the output power values for more than one bearer at least partly on the basis of said quantity, a controller to control the transmit power of at least one bearer on the basis of said transmit power values, said controller being so configured that when the transmit power of more than one bearer is configured to be determined when the transmission rate of at least one bearer changes, the controller to control the at least one of the bearers is configured to impact the control of other bearers, a generator to generate an interference effect matrix, which represents the mutual interferences of different bearers, and an inverter to invert the generated interference effect matrix in order to form new power levels.

6. The control unit according to claim 5, wherein the control unit is contained in a base station controller.

7. A power control method comprising:

defining at least one bearer as a communication entity between at least one base station and at least one mobile station, wherein the at least one base station or the at least one mobile station is configured to communicate at least partly on a spread spectrum technique, the at least one bearer including variable factors containing transmission rate, delay, bit error rate and having an impact on the communication, forming a control function at least partly on the basis of a quantity which at least partly represents the control history experienced by the at least one bearer, calculating the control function in order to determine transmit power values to be used for at least one of said bearers, determining the transmit power for more than one bearer when the transmission rate of the at least one bearer changes so that the control of said at least one of said bearers is arranged to impact the control of other bearers, generating an interference effect matrix, which represents the mutual interferences of different bearers, and inverting the generated interference effect matrix in order to form new power levels.

8. An element comprising:

a module configured to define at least one bearer as a communication entity between at least one base station and at least one mobile station, wherein the at least one base station or the at least one mobile station is configured to communicate at least partly on a spread spectrum technique, the at least one bearer including variable factors containing transmission rate, delay, bit error rate and having an impact on the communication, a generator to generate a quantity which at least partly depends on the control history experienced by at least one bearer, a device to determine the output power values for more than one bearer at least partly on the basis of said quantity, a controller to control the transmit power of at least one bearer on the basis of said transmit power values, said controller being so configured that when the transmit power of more than one bearer is configured to be determined when the transmission rate of at least one bearer changes, the controller to control the at least one of the bearers is configured to impact the control of other bearers, a generator to generate an interference effect matrix, which represents the mutual interferences of different bearers, and an inverter to invert the generated interference effect matrix in order to form new power levels.

9. A load control method in a mobile network, wherein a power control method according to claim 7 is used, said method further comprising:

calculating a power vector in order to generate candidate values to be used as powers at the beginning of the next calculation period;

making a check whether the power load exceeds a predetermined limit, whereby if the power load exceeds said predetermined limit, at least one of the following is decreased:

the transmit power of at least one transmission,
the bit rate of at least one transmission, and
the SIR target level of at least one transmission; and selecting said at least one transmission on the basis of which transmission has a corresponding candidate power value in the power vector with the greatest ratio to the number of correctly received bits of said transmission during the previous calculation period.

10. A method to manage the transmit power of bearers in a mobile network, wherein a power control method according to claim 7 is used, said method further comprising:

controlling the powers of the bearers at least partly in clusters, determining the clusters of each bearer according to the state of the bearer, calculating a power vector in order to generate candidate values to be used as powers at the beginning of a next calculation period so that the transmit power of more than one bearer is arranged to be determined when the transmission rate of at least one bearer changes, and changing the transmission power of at least one bearer cluster in accordance with the calculated candidate values to control the at least one of the bearers so to also control other bearers.

11. A base station comprising:

means for communicating at least partly on a spread spectrum technique for at least one mobile station and the base station, and wherein a bearer is defined as a communication entity between the base station and the at least one mobile station, the bearer including variable factors containing transmission rate, delay, bit error rate and having an impact on the communication, means for generating a quantity which at least partly depends on the control history experienced by at least one bearer, means for determining the output power values for more than one bearer at least partly on the basis of said quantity, means for controlling the transmit power of at least one bearer on the basis of said transmit power values, said controller being so configured that when the transmit power of more than one bearer is configured to be determined when the transmission rate of at least one bearer changes, the controller to control the at least one of the bearers is configured to impact the control of other bearers, means for generating an interference effect matrix, which represents the mutual interferences of different bearers, and means for inverting the generated interference effect matrix in order to form new power levels.

12. A control unit comprising:

means for communicating at least partly on a spread spectrum technique for at least one mobile station and at least one base station, and wherein a bearer is defined as a communication entity between the at least one base station and the at least one mobile station, the bearer including variable factors containing transmission rate, delay, bit error rate and having an impact on the communication, means for generating a quantity which at least partly depends on the control history experienced by at least one bearer, means for determining the output power values for more than one bearer at least partly on the basis of said quantity, means for controlling the transmit power of at least one bearer on the basis of said transmit power values, said controller being so configured that when the transmit power of more than one bearer is configured be determined when the transmission rate of at least one bearer changes, the controller to control the at least one of the bearers is configured to impact to the control of other bearers, means for generating an interference effect matrix, which represents the mutual interferences of different bearers, and means for inverting the generated interference effect matrix in order to form new power levels.

13. An element comprising:

means for communicating at least partly on a spread spectrum technique either for at least one mobile station or at least one base station, and wherein a bearer is defined as a communication entity between the at least one base station and the at least one mobile station, the bearer including variable factors containing transmission rate, delay, bit error rate and having an impact on the communication, means for generating a quantity which at least partly depends on the control history experienced by at least one bearer, means for determining the output power values for more than one bearer at least partly on the basis of said quantity, means for controlling the transmit power of at least one bearer on the basis of said transmit power values, said controller being so configured that when the transmit power of more than one bearer is configured to be determined when the transmission rate of at least one bearer changes, the controller to control the at least one of the bearers is configured to impact the control of other bearers, means for generating an interference effect matrix, which represents the mutual interferences of different bearers, and means for inverting the generated interference effect matrix in order to form new power levels.

14. A method according to claim 7, wherein the control function is formed at least partly on the basis of an at least partial history of the power control of at least one bearer.

15. A method according to claim 7, wherein the transmit power of more than one bearer is determined with the aid of the method when the transmission of at least one bearer is initiated.

16. A method according to claim 7, further comprising determining the transmit power of more than one bearer when the transmission of at least one bearer is terminated.

17. A method according to claim 7, further comprising determining the transmit power of more than one bearer when the transmit power of at least one bearer changes.

18. A method according to claim 7, further comprising determining the transmit power of more than one bearer when the target level of the correctness of at least one bearer changes.

19. A method according to claim 7, further comprising determining the transmit power of more than one bearer when the transmission rate of at least one bearer changes.

20. A method according to claim 7, further comprising determining the transmit power of more than one bearer when at least one base station of at least one bearer is changed in a macro diversity combination.

21. A method according to claim 7, wherein the control function is at least partly formed on the basis of the desired correctness levels of the bearers.

22. A method according to claim 7, further comprising checking whether each determined output power value is within the range formed by the typical minimum and maximum limits of the respective bearer, whereby the output power values are taken in use if no one of the values is outside said region.

23. A method according to claim 7, further comprising setting at least one element value to zero, when the value of said element is below a certain predetermined limit.

24. A method according to claim 7, further comprising:
controlling the output powers of more than one base station and the mobile stations managed by these base stations, and
forming the control function at least partly also on the basis on how strong the signal of each base station is received in at least one mobile station of each other base station.

25. A method according to claim 7, further comprising making a decision on the basis of the generated output power values for allowing the transmission of at least one bearer.

* * * * *

UNITED STATES PATENT AND TRADEMARK OFFICE
CERTIFICATE OF CORRECTION

| | | |
|---|---|---|
| PATENT NO. | : 7,587,217 B1 | Page 1 of 1 |
| APPLICATION NO. | : 09/249216 | |
| DATED | : September 8, 2009 | |
| INVENTOR(S) | : Laakso et al. | |

It is certified that error appears in the above-identified patent and that said Letters Patent is hereby corrected as shown below:

Col. 20, line 67, in Claim 2, delete "functions," and insert -- function, --, therefore.

Col. 24, line 19, in Claim 12, delete "be" and insert -- to be --, therefore.

Col. 24, line 22, in Claim 12, after "impact" delete "to".

Signed and Sealed this

Fifteenth Day of December, 2009

David J. Kappos
*Director of the United States Patent and Trademark Office*